United States Patent
Dumke et al.

[11] 3,893,044
[45] July 1, 1975

[54] LASER DEVICE HAVING ENCLOSED LASER CAVITY

[75] Inventors: William P. Dumke, Chappaqua; Jerry M. Woodall, Hartsdale, both of N.Y.

[73] Assignee: International Business Machines Corporation, Armonk, N.Y.

[22] Filed: Apr. 12, 1973

[21] Appl. No.: 350,575

[52] U.S. Cl. ............................ 331/94.5 H; 357/18
[51] Int. Cl. ............................................. H01s 3/00
[58] Field of Search .................. 331/94.5 H; 357/18

[56] References Cited
UNITED STATES PATENTS
| | | | |
|---|---|---|---|
| 3,758,875 | 9/1973 | Hayashi | 331/94.5 H |
| 3,780,358 | 12/1973 | Thompson | 331/94.5 H |

*Primary Examiner*—Edward S. Bauer
*Attorney, Agent, or Firm*—Thomas J. Kilgannon, Jr.

[57] ABSTRACT

A semiconductor laser device having an enclosed laser cavity is disclosed. The semiconductor laser is of the heterostructure type and embodiments of single and double heterostructures are disclosed. In both of the heterostructure devices disclosed, the side surfaces of the active region are well defined. This is accomplished, in one instance, by surrounding the laser active region on all side surfaces with a higher band gap material which also has a lower index of refraction. Thus, the laser cavity is partially enclosed by a semiconductor material on one conductivity type of a band gap higher than the band gap of the material of the laser cavity. The remaining portion is enclosed by a band gap material higher than the material of the laser cavity but is of opposite conductivity type to the first mentioned higher band gap material. In another instance the side surfaces of the laser active region are partially surrounded by a high band gap material and partially by a region of opposite conductivity type to the active region; both of which regions contribute carriers to the active region. The laser devices disclosed are made, for example, from layers of appropriately doped P and N type gallium arsenide and from layers of P and N type gallium aluminum arsenide. The resulting devices can have very small cavity cross sections, optical and electrical confinement of the excitation at all the side surfaces, low electrical series resistance and a low thermal resistance due to geometrical factors.

The laser devices disclosed may be fabricated using well known fabrication techniques which include deposition of the layers of the laser by liquid phase epitaxy (LPE), molecular beam epitaxy (MBE) and melt-back or etching techniques. The latter techniques define the laser cavity.

2 Claims, 5 Drawing Figures

LASER DEVICE HAVING ENCLOSED LASER CAVITY

BACKGROUND OF THE INVENTION

1. Field of the Invention

This invention relates generally to semiconductor laser devices which are capable of operation at or near room temperature. More specifically, it relates to semiconductor laser devices in which the laser cavity is surrounded by a material of higher band gap than the material of the cavity so that carriers may be efficiently introduced into the cavity through the periphery of the cavity. In this way both injected carriers and laser emission may be confined within the cavity.

Still more specifically, it relates to a semiconductor laser device which may be of the single or double heterostructure types. In one of these structures (double heterostructure), the periphery of the laser cavity region is partially surrounded by a high band gap material of one conductivity type for injecting minority carriers into the cavity and is partially surrounded by a high band gap material of opposite conductivity type which provides for the flow of majority carriers into the laser cavity region. In the other of these structures (single heterostructure), the periphery of the laser cavity is partially surrounded by high band gap material and partially by a region of opposite type conductivity to the cavity, both of which introduce carriers into the cavity. The double heterojunction laser device is amenable to fabrication in array form while the single heterostructure is amenable to fabrication as a single device. In array form, individual double heterostructure devices may be isolated one from the other and individually activated by simply activating an electrode associated with any given device. Both the single and double heterostructure devices are simply and economically fabricated and do not suffer from the deficiencies of prior art devices in which some of the side surfaces of the laser active region were not enclosed. As a result of enclosing all the sides of the laser cavity, the region of optical activity is more accurately defined and the device geometry and extent of contacts are freed from constraints imposed by the geometry of prior art semiconductor lasers.

2. Description of the Prior Art

Semiconductor injections lasers of the single and double heterostructure types are well known to those skilled in the injection laser art. All of the known devices are planar multilayer devices which are single or double heterostructure arrangements which introduce carriers across parallel, planar surfaces. The active region material, therefore, extends in all directions to the boundaries of the device. Typical devices of the character just described appear in U.S. Pat. No. 3,537,029, issued Oct. 27, 1970 in the name of H. Kressel, al., at, and in U.S. Pat. No. 3,604,991, issued Sept. 14, 1971 in the name of H. Yonezu, et al. Neither of these patents limit the extent of the laser cavity and, from a structural point of view, only introduce carriers into a cavity across plane, parallel sufaces.

SUMMARY OF THE INVENTION

The semiconductor laser of the present invention, in its broadest aspect, comprises a laser cavity region of semiconductor material and means surrounding the periphery of the cavity region for introducing carriers into said cavity.

In accordance with the broader aspects of the invention, a semiconductor laser is provided wherein the means for introducing carriers into the cavity region includes means for injecting minority carriers into said cavity by way of a portion of the periphery of said cavity and means for providing majority carriers by way of another portion of the periphery of said cavity.

In accordance with the broader aspects of the invention, a semiconductor laser is provided comprising a laser cavity of semiconductor material having a given band gap. The side surfaces of the laser cavity are partially enclosed by a semiconductor material of a band gap higher than the band gap of the material from which the laser cavity is formed. The remaining side surfaces of the laser cavity are enclosed by a material having a band gap higher than the material of the laser cavity but of opposite conductivity type to the first mentioned band gap material.

In accordance with the broader aspects of the invention, a semiconductor laser is provided comprising a laser cavity of semiconductor material. The side surfaces of the cavity are partially surrounded by a semiconductor material of a band gap higher than the band gap of the material of the laser cavity and of the same type conductivity. The remainder of the cavity side surfaces is enclosed by a material which is the same as that of the cavity but is of opposite type conductivity to the material of the cavity.

In accordance with more particular aspects of the invention, an N type region of a ternary compound of gallium arsenide is provided to either inject or provide electrons to the cavity depending on whether the conductivity type of a gallium arsenide laser cavity is P or N type. Also, a P type region of a ternary compound of gallium arsenide is provided to inject or provide holes to an active region of gallium arsenide depending on whether the active region is N or P conductivity type.

In accordance with still more particular aspects of the invention, a region of P type conductivity of a ternary compound of gallium arsenide is provided to provide holes to the laser cavity. The latter is of the same type conductivity as the ternary compound. Also, a region of N type conductivity material which is of the same material as the cavity is provided to inject electrons depending on the conductivity type of the cavity. This region is always of opposite type conductivity to that of the cavity.

In accordance with still more particular aspects of the invention, contacts for applying potentials to cause lasing are applied via conductive semiconductor contact regions to the regions of opposite conductivity type high band gap materials which surround the laser cavity.

It is therefore an object of this invention to provide an injection laser which is operable at room temperature.

Another object is to provide a semiconductor laser in which the side surfaces of the active region are completely surrounded by materials which introduce carriers into the active region.

Another object is to provide a semiconductor laser in which the sides of the active region is completely surrounded by high band gap materials which introduce carriers into a laser cavity.

Another object is to provide a laser device which is amenable to fabrication in array form which is of higher efficiency, and lower thermal and electrical impedance than prior art devices.

Still another object is to provide semiconductor lasers of the double heterostructure types which have laser cavities surrounded on all sides by materials with higher band gaps than the material of the cavity.

The foregoing and other objects, features and advantages of the invention will be apparent from the following more particular description of a preferred embodiment of the invention, as illustrated in the accompanying drawings.

DESCRIPTION OF PREFERRED EMBODIMENTS

Figure 1:
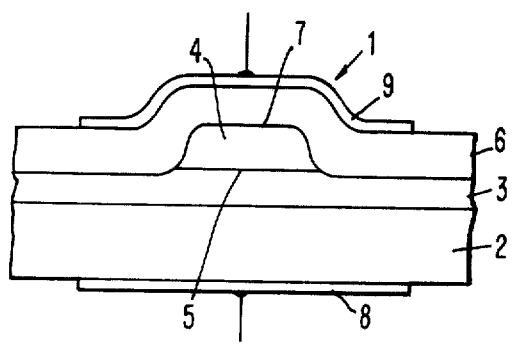
FIG. 1 is a cross sectional view of a laser device having a laser cavity, the periphery of which is surrounded by material which introduces carriers into the laser cavity.

Referring now to FIG. 1, there is shown therein a cross sectional view of a double heterostructure laser 1 having a configuration in accordance with the teaching of the present application. Laser 1 comprises a substrate 2 of semiconductor material, preferably gallium arsenide of N⁺ conductivity type to render substrate 2 conductive. Substrate 2 is rendered conductive by adding the highest possible amounts of dopants without introducing damage into the substrate. Typical N type dopants are tin, tellurium, sulfur and selenium. A layer 3 of material of N type conductivity with a band gap higher than active region 4 is disposed on a surface of substrate 2. Layer 3 is preferably formed from the ternary compound gallium aluminum arsenide which is doped with tin, tellurium, sulfur or selenium to render it of N type conductivity. The N type dopant added is greater than $10^{17}$ atoms/cc. Layer 3 has a thickness of approximately 1–5 microns. An active region 4 of a P type semiconductor material, preferably gallium arsenide, is disposed atop a portion of layer 3 and forms at their interface a heterojunction 5 having a width in the range of 2 to 20 microns. Active region 4 is rendered of P type conductivity by introducing dopants such as zinc, silicon, germanium or cadmium in concentrations of approximately $10^{18}$ atoms/cc. A layer 6 of P type conductivity semiconductor material preferably of the ternary compound gallium aluminum arsenide is disposed atop the exposed portion of layer 3 and around the exposed periphery of active region 4. The interface between the periphery of active region 4 and layer 6 forms a heterojunction 7. Layer 6 is rendered P type conductivity by introducing dopants such as zinc, silicon, germanium, or cadmium in concentrations greater than $10^{17}$ atoms/cc. into the gallium aluminum arsendide.

At this point, it should be noted that active region 4 of gallium arsenide is totally surrounded or enclosed by the gallium aluminum arsenide material of layers 3 and 6 which are of N and P type conductivity, respectively. As indicated hereinabove, two heterojunctions 5, 7 are formed. Hence, the designation double heterostructure for the laser device of FIG. 1.

In FIG. 1 contacts 8, 9 are applied to layers 2, 6, respectively. Contact 8 which is a contact to the N type conductivity substrate 2 may be formed from a gold-germanium-nickel alloy. Alternatively, an alloy of gold-tin or tin alone may be utilized as the material for contact 8. Contact 9 which is applied to layer 6 must be compatible with a P type conductivity material. Accordingly, contact 9 may be fabricated from gold-zinc, indium-gold, or indium alone.

The completed device 1 as shown in FIG. 1 is made operable by applying a potential across contacts 8, 9.

In connection with active region 4, it should be appreciated that region 4 can be of N or P type conductivity. Thus, in the arrangement shown in FIG. 1 it makes no difference whether region 4 is P or N conductivity type for, in any case, carriers are introduced into active region 4. Thus, in the arrangement shown in FIG. 1 electrons are injected into region 4 from layer 3 across heterojunction 5. Also, holes are caused to flow from P type conductivity layer 6 across heterojunction 7 into active region 4 where, when holes and electrons recombine, lasing action occurs and light is emitted through the cleaved surfaces which terminate region 4. The cleaved surfaces, of course, act as reflectors for the laser cavity formed by active region 4.

If active region 4 were of N conductivity type in FIG. 1, holes would be injected across heterojunction 7 into region 4 from layer 6 and electrons would be caused to flow across heterojunction 5 from N type conductivity layer 3. From this, it should be clear that carriers are introduced into active region 4 from the high band gap semiconductor materials which are disposed adjacent portions of active region 4. It should also be noted that active region 4 is highly delimited as compared with prior art double heterojunction planar structures which have side surfaces terminated by the boundary of the laser device.

The structure of FIG. 1 has all the advantages of prior art double heterojunction lasers with the additional features of currnet confinement and optical confinement provided at the side surfaces of active region 4 by the high band gap semiconductor materials. Thus, electrons injected into the P type conductivity gallium arsenide region 4 from N conductivity type layer 3 cannot flow into the surrounding P type conductivity type layer 6 because of the conduction band discontinuity between these materials. In addition to providing a solution to the problem of introducing carriers in a desired way (by providing in the usual current path a high band gap material of opposite conductivity type so that the preferred carrier path will be into active region 4 and not across the P-N junction between layers 3 and 6) enclosing active region 4 also prevents spreadout of current in layer 6. Although the junction 5 between layer 3 and active region 4 is in parallel with a larger area junction between layers 3 and 6, virtually all the current flow consists of electron injection into active region 4 across junction 5. The considerably larger band gap of gallium aluminum arsenide compared with gallium arsenide results in a higher forward bias voltage requirement for flow in the P-N junction between layers 3 and 6 than for injection across junction 5 into the gallium arsenide active region 4.

Figure 2A:
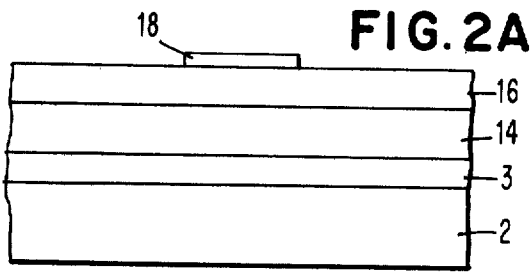
FIGS. 2A, 2B, 2C show the device of FIG. 1 at intermediate stages in its fabrication.
Figure 2B:
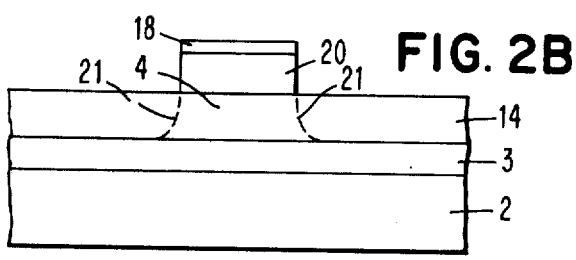
Figure 2C:
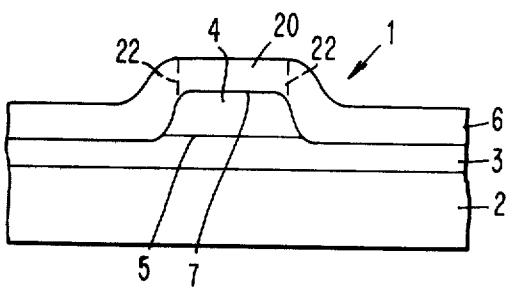

Compared to a laser device which is cleaved or mesa-etched to define the sides fo the active region, the structure of FIG. 1 allows large area electrical contacts and has significantly lower series electrical and thermal resistances. Another important advantage of the structure of FIG. 1 lies in the relative ease with which it can be fabricated. Referring now to FIGS. 2A–2C which show intermediate stages in the fabrication of the device of FIG. 1, the following fabrication steps can be utilized to form the device of FIG. 1. Where the same elements of FIG. 1 are shown in FIGS. 2A–2C, the same reference characters are utilized.

Referring now to FIG. 2A, there is shown therein the device of FIG. 1 at an intermediate stage of its fabrication. Specifically, layers 3, 14, and 16 are deposited on substrate 2 using a prior art liquid phase epitaxial deposition on substrate 2 using a prior art liquid phase epitaxial deposition technique (LPE) or molecular beam epitaxy (MBE). Thus, layer 3 of N conductivity type gallium aluminum arsenide ($Ga_{1-x}Al_xAs$), where $1 \geq x \geq 0.2$, is deposited on the surface of $N^+$ conductivity type gallium arsenide. As indicated hereinabove, layer 3 may be formed by well known liquid phase epitaxial or molecular beam epitaxial techniques. Liquid phase epitaxial techniques applicable to the present invention are described in the following articles:

"A New Technique for Terminating Liquid Phase Epitaxial Growth" by R. and J. M. Woodall, *Journal of the Electrochemical Society*, Vol. 119, No. 2, February 1972, pp. 277–9.

"$Ga_{1-x}Al_xAs$ LED structures Grown on GaP Substrates" by J. M. Woodall, R. M. Potemski and S. E. Blum, *Applied Physics Letters*, Vol. 20, No. 10, May 15, 1972, pp. 375–7.

"Solution Growth $Ga_{1-x}Al_xAs$ Superlattice Structures" by J. M. Woodall, *Journal of Crystal Growth*, 12 (1972) 32–38.

U.S. Pat. No. 3,560,276 issued Feb. 2, 1971, in the name of M. E. Panish, et al., entitled "Technique for Fabrication of Multilayered Semiconductor Structure" is a prior art patent which may be utilized in the practice of the present invention.

In one prior art liquid phase epitaxial technique, semiconductor layers may be deposited in the following way:

A substrate of appropriately doped semiconductor material, N type conductivity gallium arsenide, in the present instance, is introduced into a saturated melt of appropriately doped semiconductor material, N type conductivity $Ga_{1-x}Al_xAs$, in the present instance, to cause precipitation of a layer of the ternary compound on the substrate by slowly cooling to an appropriate temperature. Successive layers are similarly formed by introducing the substrate into saturated melts of the desired composition and doping and then slowly cooling to precipitate the layers.

As indicated hereinabove, layers of the desired materials 3, 14, and 16 may be successively formed on substrate 2 in FIG. 2A by molecular beam epitaxial deposition. One technique which may be utilized in the practice of the present invention is shown in an article in the IBM Technical Disclosure Bulletin, Vol. 15, No. 2, July 1972, p. 365, entitled, "Fabrication for Multilayer Semiconductor Devices" By L. L. Chang, et al.

Thus, using well known prior art deposition techniques, layers 3, 14, and 16 shown in FIG 2A may be sequentially deposited on substrate 2.

As indicated in connection wiith the discussion of FIG. 1 substrate 2 is formed from an $N^+$ type conductivity layer of gallium arsenide. Layers 3, 14, and 16 are formed from N type conductivity $Ga_{1-x}Al_xAs$, P type conductivity GaAs and P type conductivity $Ga_{1-x}Al_xAs$, respectively. After deposition of layers 3, 14, and 16, a layer of photoresist or similar masking layer is spun onto the surface of layer 16. After an appropriate exposure and development step well known to those skilled in the photolithographic arts, a mask 18 of photoresist or other suitable masking material is disposed over a portion of layer 16.

Layer 16 which is formed of P type conductivity GaAlAs is then etched by applied hydrochloric acid (HCl) for a time sufficient to remove layer 16 everywhere except under mask 18. FIG. 2B shows a region 20 of P type conductivity GaAlAs which is all that remains of originally deposited layer 16.

In a succeeding step, region 20 is utilized as a mask for layer 14 which is of P type conductivity GaAs. By applying a selective etch which attacks only GaAs and not the ternary compound GaAlAs, layer 14 may be removed down to the surface of layer 3 everywhere except in the region bounded by dashed lines 21. The selective etch utilized consists of $NH_4OH:H_2O_2:H_2O$ in the proportions by volume of 1:1:2.

The selective etching process which removes the portions of layer 14 is self-stopping in that when the surface of layer 3 is encountered by the etch, etching ceases.

It should be clear, at this point, from a consideration of FIGS. 1 and 2B that the region of layer 14 bounded by dashed lines 21 in FIG. 2B is active region 4 as shown in FIG. 1. At this juncture, layer 6 of FIG. 1 is formed by depositing a layer of P type GaAlAs on the exposed surfaces of layer 3 and over region 20 which is already of P type conductivity GaAlAs. In this step, layer 6 is formed preferably by a molecular beam epitaxial deposition technique. FIG. 2C shows layer 6 covering the exposed portions of layer 3 and including region 20 shown bounded by dashed lines 22. From a consideration of FIGS. 1 and 2C, it should be clear that active region 4 is now completely surrounded on its side surfaces by regions of high band gap GaAlAs which define active region 4 and which introduce carriers into active region 4. Because the layers 3 and 6 are of opposite conductivity type, it should be clear that both majority and minority carriers are being introduced into active region 4. Thus, in the structure of FIG. 2C. N type conductivity GaAlAs injects electrons across heterojunction 5 while layer 6 of P conductivity type GaAlAs flows holes across heterojunction 7. At this point, it should be apparent that the conductivity type of the various layers and regions described hereinabove in connection with FIGS. 2A–2C can each be reversed and that under such circumstances lasing action occurs in active region 4. Since layers 3 and 6 are already of opposite conductivity type, it should be apparent that by simply changing the conductivity type of active region 4 that the various layers and regions have been effectively reversed.

In connection with the fabrication process described hereinabove in connection with FIGS. 2A–2C, alternative approaches are available to the selective etching step described hereinabove in conjunction with layer 14 of FIG. 2B. In FIG. 2B, instead of applying the selective etch to remove portions of GaAs layer 14, the substrate with layer 14 masked by region 20 is subjected to a melt back step which removes portions of layer 14 to provide the region 4 bounded by dashed lines 21 as shown in FIG. 2B. The melt back of portions of layer 14 is achieved by inserting the structure into a nearly saturated melt with a composition nominally that which causes the precipitation of layer 6. Saturation will be completed when the exposed portions of layer 14 are dissolved by the melt.

After concluding the melt back step, layer 6 is formed by a liquid phase epitaxial step which results in the arrangement of FIG. 2C.

In connection with FIG. 2C, where an overgrowth of greater thickness appears over region 4 than that over the exposed surfaces of layer 3, the overgrowth may be reduced by grinding or other removal process to insure that layer 6 is of substantially the same thickness everywhere.

While not specifically shown in the fabrication process, it should be clear that contacts 8, 9 of FIG. 1 may be formed by techniques well known to those in the semiconductor fabrication arts. For example, metal layers compatible with N and P type semiconductor materials may be evaporated on the upper and lower surfaces of layers 6, 2, respectively. The contacts are then delineated, using well known photolithographic masking and etching techniques to determine the extent and shape of the contacts. Alternatively, using masks with appropriate openings, the contacts may be deposited by vacuum evaportion or the like to control the shape and extent of contacts 8,9. Also, while not specifically shown in FIGS. 1 and 2C, a layer of highly doped P type conductivity gallium arsenide may be interposed between layer 6 and contact 9.

Figure 3:
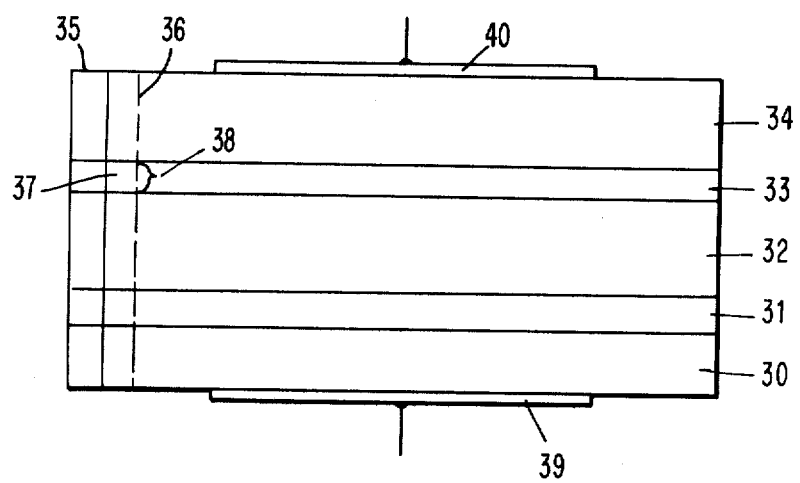
FIG. 3 is a cross sectional view of a heterojunction post alloy diffused injection laser wherein the laser cavity is partially surrounded by regions of higher band gap material which introduce carriers into the cavity.

Referring now to FIG. 3 there is shown a cross sectional view of a heterojunction post alloyed diffused injection laser wherein the laser cavity is surrounded by regions of semiconductor material all of which introduce carriers into an active laser cavity region. In this instance, the active cavity region is surrounded on three sides by regions of higher band gap material while a fourth side is bounded by a PN homojunction which also introduces carriers.

The structure of FIG. 3 is fabricated by depositing by liquid phase epitaxy layers of gallium arsenide and gallium aluminum arsenide on a gallium arsenide substrate. Specifically, in FIG. 3, a substrate 30 of P type conductivity gallium arsenide has layers 31, 32, 33 and 34 of P conductivity type $Ga_{1-x}Al_xAs$, N conductivity type $Ga_{1-x}Al_xAs$, N type conductivity gallium arsenide and N conductivity type $Ga_{1-x}Al_xAs$, respectively, formed thereon in succession by liquid phase epitaxy. In layers 31, 32 and 34 formed from gallium aluminum arsenide ($Ga_{1-x}Al_xAs$), where the layer is N type conductivity, tin may be used as a dopant and where P type conductivity, zinc may be used as a dopant. The thickness of layer 33 of N type conductivity gallium arsenide determines the width of the active junction region which may be as small as a few microns. A regrown region 35 which is formed after cleaving the left side of the layered structure of FIG. 3 is provided by depositing a thin layer consisting of a mixture of zinc and aluminum on the cleaved side of the structure of FIG. 4. At elevated temperatures (650°–850°C), the zinc-aluminum layer is alloyed into the gallium aluminum arsenide and gallium arsenide layers resulting in a p+gallium aluminum arsenide regrown region 35. Maintaining the structure of FIG. 3 at a temperature just below the alloying temperature of the materials allows the further diffusion of zinc into gallium arsenide layer 33 and also into the gallium aluminum arsenide layers 32, 34 producing PN junctions in these regions as indicated by dashed line 36. As a result of the diffusion of zinc, an active P type region 37 is formed within N type conductivity gallium arsenide layer 33. In this manner, active region 37 forms a PN homojunction 38 with N type conductivity gallium arsenide layer 33. The remaining periphery of active region 37 forms a heterojunction with P type $Ga_{1-y}Al_yAs$ which was formed as a result of the alloying and diffusion steps described hereinabove.

Contacts 39, 40 of metals compatible with P and N type conductivity type materials, respectively, are formed on layers 30, 34, respectively.

In forward bias, the only significant current flows across PN junction 38 in layer 33 because of the higher band gap and barriers for injection in regions 32, 34. The heterjunction formed between the regrown P conductivity type GaAlAs of region 35 and active region 37 acts to confine injected electrons to the latter region. The loss of coherent radiation from active region 37 should be low since it is bounded on three sides by GaAlAs having a lower index of refraction. The series electrical resistance is also low since this structure has rather large N and P regions feeding current to the narrow PN junction 38. Similarly, heat will mainly be generated from a rather small junction areas and can be dissipated almost radially to the remainder of the structure. In connection with the structure of FIG. 3, $Ga_{1-x}Al_xAs$ is utilized for layers 31, 32, 34 wherein $x$ has values $0.2 \leq x \leq 1$. For the $Ga_{1-y}Al_yAs$ used to form the high band gap layer 35, $0.2 \leq y \leq 1$.

In operation, the structure of FIG. 3 produces radiation when electrons are injected from N type conductivity layer 33 across PN junction 38 where they recombine with holes which flow across the hetereojunction which surrounds active region 37 on its remaining three sides. While the embodiment of FIG. 3 bears a superficial resemblance to prior art heterojunction structures wherein the active layer extends to the boundary of the device, it should be appreciated that in the prior art regime, carriers are not introduced into the active region by the layer from which the active region is formed because, in the usual case, current density diverges as it penetrates the semiconductor layer thereby causing carriers to flow away, if anything, from the laser active region.

Two devices have been described hereinabove, both of which have small active regions the size of which are surrounded by semiconductor materials which introduce carriers into the active region where recombination of carriers results in emission of light. In one instance, the active region is a cavity of semiconductor material the side surfaces of which are surrounded by high band gap material. In the other instance, a similar cavity is partially surrounded by high band gap material and partially by a material of opposite conductivity type to that of the cavity, all of which introduce carriers into the laser cavity. Both of the devices have very small cavity cross section and optical and electrical confinement of the excitation at all the side surfaces is achieved. In both of the devices disclosed, (a pair of heterojunctions in one device and, a homojunction and a heterojunction in the other device) the junctions are coextensive with and equal to the cavity periphery. In addition to achieving highly efficient introduction of carriers into the cavity, low series electrical and low thermal resistance result from the geometry utilized. While the invention has been described in terms of single devices, it should be clear that the structure of FIG. 1A is amenable to fabrication in array form without substantially changing the process utilized in fabricating a single device.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A semiconductor laser comprising:
   a substrate of P type conductivity gallium arsenide,
   a first layer of P type conductivity gallium aluminum arsenide disposed on said substrate,
   a second layer of N type conductivity gallium aluminum arsenide disposed on said first layer,
   a third layer of N type conductivity gallium arsenide disposed on said second layer forming with said second layer a NN heterojunction,
   a fourth layer of N type conductivity gallium aluminum arsenide disposed on said third layer forming with said third layer a NN heterojunction,
   a regrown region of P type conductivity gallium aluminum arsenide intersecting a portion of said substrate and each of said layers forming with said third layer a PP heterojunction,
   a diffusion front emanating from said regrown region forming within a portion of said third layer a P type conductivity region said front forming with said third layer a PN homojunction.

2. A semiconductor laser according to claim 1 further including metallic contacts connected to said substrate and said fourth layer.

* * * * *